United States Patent [19]

Waldvogel et al.

[11] 4,273,780
[45] Jun. 16, 1981

[54] ANTI-ALLERGIC ANTI-9,10-DIHYDRO-4-(1-METHYL-4-PIPERIDYLIDENE)-4H-BENZO[4,5]CYCLOHEPTA[1,2-B]THIOPHEN-10(9H)-ONE OXIME

[75] Inventors: Erwin Waldvogel, Aesch; Jean-Michel Bastian, Therwil; Gustav Schwarb, Allschwil, all of Switzerland

[73] Assignee: Sandoz Ltd., Basel, Switzerland

[21] Appl. No.: 110,443

[22] Filed: Jan. 8, 1980

Related U.S. Application Data

[63] Continuation of Ser. No. 37,720, May 11, 1979, abandoned, which is a continuation of Ser. No. 869,101, Jan. 13, 1978, abandoned, which is a continuation-in-part of Ser. No. 754,984, Dec. 28, 1976, abandoned.

[30] Foreign Application Priority Data

Jan. 2, 1976 [GB] United Kingdom .................. 50/76

[51] Int. Cl.³ .................. A61K 31/445; C07D 409/02
[52] U.S. Cl. .................................... 424/267; 546/202
[58] Field of Search ......................... 546/202; 424/267

[56] References Cited

U.S. PATENT DOCUMENTS 3,862,156  1/1975  Bourquin et al. .................... 546/202

OTHER PUBLICATIONS

March, J., *Advanced Organic Chemistry,* McGraw Hill, New York, 1968, pp. 94–97.

*Primary Examiner*—Richard A. Schwartz
*Attorney, Agent, or Firm*—Gerald D. Sharkin; Robert S. Honor; Timothy G. Rothwell

[57] ABSTRACT

The present invention provides anti-9,10-dihydro-4-(1-methyl-4-piperidylidene)-4H-benzo[4,5]-cyclohepta[1,2-b]thiophen-10(9H)-one oxime of formula

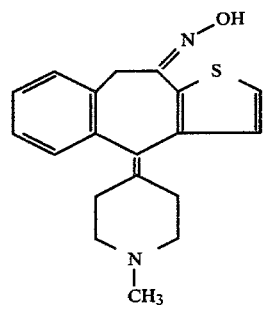

useful for the treatment of allergic conditions.

3 Claims, No Drawings

ANTI-ALLERGIC ANTI-9,10-DIHYDRO-4-(1-METHYL-4-PIPERIDYLIDENE)-4H-BENZO[4,5]CYCLOHEPTA[1,2-B]THIOPHEN-10(9H)-ONE OXIME

This is a continuation, of application Ser. No. 37,720, filed May 11, 1979, now abandoned, which in turn is a contintuation, of application Ser. No. 869,101, filed Jan 13, 1978, now abandoned, which, in turn is a continuation-in-part of Ser. No. 754,984, filed Dec. 28, 1976, now abandoned.

The present invention provides anti(seq-trans)-9,10-dihydro-4-(1-methyl-4-piperidylidene)-4H-benzo[4,5-]cyclohepta[1,2-b]thiophen-10(9H)-one oxime of formula I,

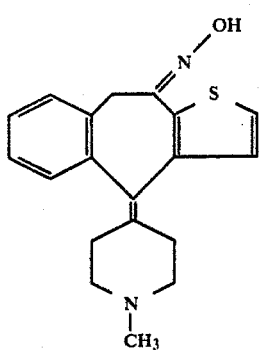

in a form free, or substantially free, from the corresponding syn(seq-cis)-isomer.

The invention also provides a process for producing the anti-isomer of formula I, in a form free, or substantially free, from the corresponding syn-isomer, which comprises:

(a) separating said anti-isomer of formula I from a mixture of the syn- and anti-isomers, or (b) isomerising the syn-isomer in an anhydrous, polar solvent under strongly basic conditions at an elevated temperature.

The separation according to process variant (a) may be effected in conventional manner, for example by fractional crystallization from a suitable organic solvent, e.g. chloroform.

In process variant (b) suitable solvents include lower aliphatic alcohols, for example tert.-butyl alcohol. Suitable bases include lower aliphatic alcoholates of sodium or potassium, for example sodium methylate, sodium ethylate, or, especially, potassium tert.-butylate. The reaction may suitably be effected at a temperature of from 50° C. to 120° C., especially 100° C. The process may suitably be effected using a mixture of syn- and anti-isomers produced, for example, as hereinafter described.

By free, or substantially free, we mean that the anti-isomer contains less than 5%, preferably less than 3% and more preferably less than 1% by weight of the syn-isomer.

The mixture of syn- and anti-isomers may, for example, be produced by condensing a compound of formula II,

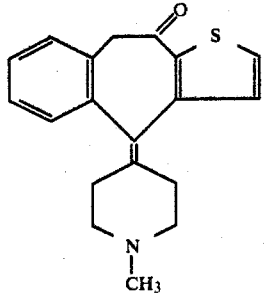

with hydroxylamine.

The condensation may be effected as, for example, described in U.K. Pat. No. 1,415,591 and U.S. Pat. No. 3,862,156.

The free base form of the compound of formula I may be converted into acid addition salt forms and vice versa in conventional manner.

In the following Examples, all temperatures are indicated in degrees Centigrade and are uncorrected.

EXAMPLE 1

Anti-9,10-dihydro-4-(1-methyl-4-piperidylidene)-4H-benzo[4,5]cyclohepta[1,2-b]thiophen-10(9H)-one oxime A mixture of 4 g of 9,10-dihydro-4-(1-methyl-4-piperidylidene)-4H-benzo[4,5]cyclohepta[1,2-b]thiophen-10(9H)-one, 4 g of hydroxylamine hydrochloride and 40 ml of anhydrous pyridine is boiled for 10 hours. After cooling to 20°-25°, the mixture is treated with 50 ml of water and extracted with chloroform. The chloroform extracts are extracted with 1 N hydrochloric acid. The aqueous extracts are made alkaline with concentrated sodium hydroxide solution and then extracted with chloroform. The chloroform extracts are concentrated and the residue is crystallized from chloroform to afford the title compound in pure form; M.P. 268°-269°.

EXAMPLE 2

Anti-9,10-dihydro-4-(1-methyl-4-piperidylidene)-4H-benzo[4,5]cyclohepta[1,2-b]thiophen-10(9H)-one oxime A mixture of 155.0 g of 9,10-dihydro-4-(1-methyl-4-piperidylidene)-4H-benzo[4,5]cyclohepta[1,2-b]thiophen-10(9H)-one oxime (approximately 50% by weight mixture of syn- and anti-isomers) and 400.0 g of potassium tert.-butylate in 1.5 l of tert.-butyl alcohol is stirred for 15 hours at 100°. Thereafter, 100.0 g of potassium tert.-butylate is added and stirring continued for 5 hours at the same temperature. The warm mixture is then poured onto 2 kg of ice, diluted with 2 l of water and extracted with methylene chloride. The extracts are washed with water, dried over magnesium sulphate and concentrated, whereby the title compound crystallizes out. The product is recrystallized 1 or 2 times from methanol. M.P. 268°-269° (content of syn-isomer less than 5% by NMR and less than 2% by thin layer chromatography).

It has now been found that the anti-isomer of formula I possesses disodium chromoglycate (DSCG)-like activity, in particular histamine release inhibiting activity, and is therefore useful in the treatment and prophylaxis of allergic conditions, such as allergic asthma, exercise-induced asthma, and allergic gastro-intestinal disorders as indicated in the passive cutaneous anaphylaxis (PCA) test in the rat, based on the principles of Mota, J. (1964)

Immunology 7, 681. Female rats (180–200 g) are sensitised by intramuscular administration of 2 mg of egg albumen (Merck No. 967) dissolved in 0.1 ml of physiological saline and 0.5 ml of Haemophiluspertussis vaccine (Schweizerisches Serum and Impfinstitut, Bern, Nr. 115,325; 4×10$^{10}$ organism/ml) intraperitoneally. Fourteen days later, the animals are exsanguinated, the blood centrifuged, the serum collected and deep frozen. The serum thus obtained (anit-serum) is injected intradermally (0.1 ml of a 1:2 diluted serum per injection site) at four sites on the backs of untreated, female rats. Twenty four hours later, each rat is administered from 0.1 mg/kg to 3.2 mg/kg p.o. of the test compound, and either immediately or 5 or 30 minutes afterwards (in the case of intravenous administration) or 60 minutes afterwards (in the case of oral administration) egg albumin (5 mg/ml i.v.) dissolved in physiological saline containing 0.25% of Evans blue dye (Merk No. 3169). The egg albumen elicits a cutaneous anaphylactic reaction, the intensity of which is proportional to the extent to which the Evans blue dye diffuses into the tissue surrounding each of the four sensitisation sites. Thirty minutes after the administration of the egg albumin, the rats are killed with ether, the underside of the skin of the back of each animal is exposed and the diameter of the areas of blue dye surrounding each of the four sensitisation sites is measured. Each dose of the test compound is investigated in between four and six rats and the mean diameter compared with the mean value obtained in four solvent-treated control rats. The percentage inhibition is taken as the percentage of the mean diameter in the test animals relative to the mean diameter in the controls.

The DSCG-like activity, in particular histamine release inhibiting activity, can be confirmed by inhibition of histamine release in the rat peritoneal mast cell test, basically as described by Kusner et al., J. Pharmacol. Exp. Therap. 184, 41–46 (1973), with the following modification: after sedimentation of the mast cells by centrifugation at 350×g and 4° C., the sediments are taken up in 1 ml of Hank's balanced salt solution (HBSS) (buffered to a pH of 6.9) and pooled. The resulting suspension is centrifuged, washed again with HBSS and sedimented. The thus purified mast cells are prepared as 2 ml suspensions in HBSS. To these are added either 2 ml of HBSS, to determine the spontaneous histamine release, or 2 ml of HBSS and 2.24 μg of compound 48/80 (N-methylhomoanisylamineformaldehyde condensate; a histamine liberator from Burroughs Wellcome and Co. Inc., Tuckahoe, N.Y. USA), to determine the 48/80 induced histamine release, or 2 ml of HBSS with 2.24 μg of 48/80 and from 1.8 to 180 μg/ml of the test compound, to determine the 48/80 induced histamine release in the presence of the test compound.

The 48/80 induced histamine release minus the spontaneous histamine release is taken as 100% histamine release. The 48/80 induced histamine release in the presence of the test compound minus the spontaneous histamine release is then compared with the 100% value to determine the percentage inhibition by the test compound. [The histamine determination is effected in conventional manner, for example as described in the above-mentioned Kusner et al. article, or in Kusner and Herzig, Advances in Automated Analysis, 429 (1971)].

The above uses are also indicated by the fact that the anti-isomer of formula I also antagonises the effect of serotonin and acetylcholine, as indicated in standard tests. For example, the above effects are observed in guinea pigs on i.v. administration of serotonin creatinine sulphate (110 mg/kg) or acetylcholine iodide (240 mg/kg) in the test method according to D. Roemer and H. Weidmann [Med. Welt 17, 2791 (1966)].

For the above-mentioned uses, the dosage administered will, of course, vary depending on the mode of administration and treatment desired. However, in general, satisfactory results are obtained when administered at a daily dosage of from about 0.01 to about 100 mg/kg, suitably from about 0.01 to about 1 mg/kg, preferably from about 0.1 to about 1 mg/kg of animal body weight, conveniently given in divided doses two to four time daily, or in sustained release form. For the larger mammals, the total daily dosage is in the range of from about 0.1 to about 100 mg, preferably from about 0.1 to about 10 mg, more preferably from about 1 to 10 mg of the compound admixed with a solid or liquid pharmaceutical carrier or diluent, e.g. for administration orally.

The anti-isomer of formula I possesses a particularly interesting pharmacological profile, e.g. level of activity, having regard to known compounds of similar type.

The compound may be administered in free base or in pharmaceutically acceptable acid addition salt form. Such salts possess the same order of activity as the free base form and are readily prepared in conventional manner. Examples of suitable acids for salt formation include hydrochloric, sulphuric, maleic and fumaric acids.

The invention also provides a pharmaceutical composition comprising the anti-isomer of formula I, in free base form or in pharmacuetically acceptable acid addition salt form in association with a pharmaceutically acceptable carrier or diluent. Such compositions may be in the form of, for example, a capsule, solution or spray.

What is claimed is:

1. Anti-9,10-dihydro-4-(1-methyl-4-piperidylidene)-4H-benzo[4,5]cyclohepta[1,2-b]thiophen-10(9H)-one oxime of formula,

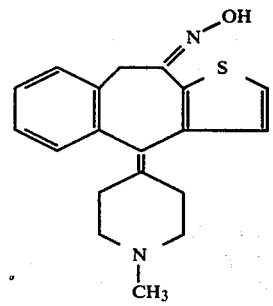

containing less than 5% of the corresponding syn-isomer.

2. A pharmaceutical composition for use in treating allergic conditions which comprises a therapeutically effective amount of the anti-isomer of claim 1, in free base form or in pharmaceutically acceptable acid addition salt form in association with a pharmaceutically acceptable carrier or diluent.

3. A method of preventing or treating allergic conditions which comprises administering to an animal in need of such treatment an anti-allergic effective amount of the anti-isomer of claim 1.

* * * * *